STABILIZATION CIRCUIT

Filed May 14, 1965

PRIOR ART

INVENTORS
JAMES L. WALSH
JOHN R. TURNBULL, JR.
BY [signature]
ATTORNEY

United States Patent Office 3,405,285

Patented Oct. 8, 1968

3,405,285

STABILIZATION CIRCUIT

James L. Walsh, Hyde Park, and John R. Turnbull, Jr., Wappingers Falls, N.Y., assignors to International Business Machines Corporation, Armonk, N.Y., a corporation of New York Filed May 14, 1965, Ser. No. 455,911

13 Claims. (Cl. 307—239)

ABSTRACT OF THE DISCLOSURE

A high speed digital current switch circuit that is stabilized even under certain high frequency conditions of operation with a relatively small effect upon circuit operating speeds. Connected in parallel with the resistive means is a load circuit with capacitive characteristics, which, unless corrected, allow the circuit to oscillate over a predetermined range of frequencies. Reactance means are connected in shunt with the resistive means and are responsive to the occurrence of frequency components of the unstable range of the circuit to reduce the effective resistance in the emitter circuit and to thereby stabilize the overall circuit.

This invention relates to electronic circuits which exhibit instability over certain frequency ranges, and more particularly to stabilization circuits for eliminating such instabilities.

A well known high speed digital circuit is the "current switch" which is described and claimed in U.S. Patent 2,964,652 to H. S. Yourke, assigned to the same assignee as this application. Due primarily to the inherent speed characteristics of the current switch, its use in the data processing industry has become increasingly significant as requirements for higher computer speeds have arisen. Notwithstanding the increased usage of the circuit, the current switch is not without its drawbacks. More specifically, under certain high frequency conditions of operation, the current switch becomes unstable and oscillates. This fact has been treated extensively in the literature, with a rather complete analysis of the phenomenon appearing in the "Handbook of Semiconductor Electronics" by Hunter (2nd Edition), 1962, at pages 15–21—15–23.

Briefly, the current switch can be generalized as an emitter follower circuit and an expression written for its input impedance. From an analysis of the impedance expression, the emitter follower is seen to exhibit negative resistance characteristics over certain frequency ranges of operation. This phenomenon may be explained by realizing that at such frequencies, the circuit package line inductances become appreciable and in combination with the inherent load capacitances seen by the circuit satisfy all necessary criteria for self sustained oscillations.

A number of stabilization techniques have been proposed to eliminate the aforementioned negative resistance characteristic, with four of the more practical appearing at page 15–23 in the Hunter reference. Each of these stabilization techniques, however, takes its toll in circuit speed.

Accordingly, it is an object of this invention to provide a current switch with improved stability characteristics.

It is a further object of this invention to provide a current switch stabilization circuit which has a relatively small effect upon circuit operating speeds.

It is still a further object to provide an improved emitter follower stabilization circuit.

In its broadest aspects, the invention includes a semiconductor circuit having resistive means in its emitter circuit. Connected in parallel with the resistive means is a load circuit with capacitive characteristics, which, unless corrected, allow the circuit to oscillate over a predetermined range of frequencies. Reactance means are connected in shunt with the resistive means and are responsive to the occurrence of frequency components in the unstable range of said circuit to reduce the effective resistance in the emitter circuit and to thereby stabilize the overall circuit.

The foregoing and other objects, features and advantages of the invention will be apparent from the following more particular description of preferred embodiments of the invention as illustrated in the accompanying drawings.

Figure 1:
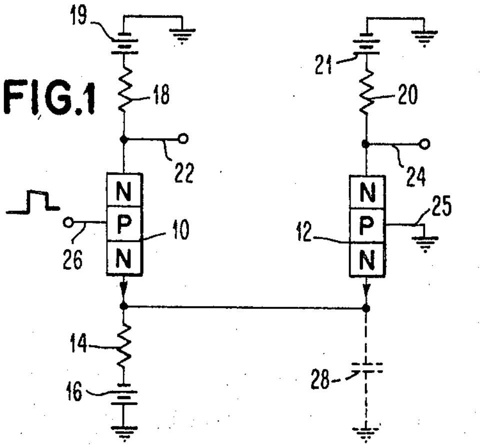
FIG. 1 is a circuit diagram of a prior art current switch.

Referring now to FIG. 1, transistors 10 and 12 are connected in the known current switch configuration. The emitter electrodes of transistors 10 and 12 are connected in common through resistor 14 to a source of negative potential 16. Potential source 16 and resistor 14 combine to create a substantially constant current source. The collectors of transistors 10 and 12 are respectively connected through resistors 18 and 20 to sources of positive potential 19 and 21, and the circuit outputs are taken via collector-connected conductors 22 anud 24 respectively. Base conductor 25 of transistor 12 is connected to ground potential and base conductor 26 of transistor 10 is utilized as the circuit input terminal.

In operation, if an up or "high" voltage is applied to base conductor 26, transistor 10 is rendered conductive and its emitter potential rises to nearly its collector potential. This potential rise back-biases the emitter-base juncton of transistor 12 and allows the current emanating from resistor 14 to be entirely accepted by transistor 10. On the other hand, if a "low" or down potential is applied to conductor 26, transistor 10 is rendered nonconductive and the emitter base junction of transistor 12 becomes forward biased due to the negative potential of supply 16. In this case, transistor 12 accepts all of the current from resistor 14.

When transistor 12 is nonconductive, its emitter-base junction appears as a virtual capacitance (e.g., capacitor 28 shown in phantom) to the emitter circuit of transistor 10. When analyzed under these conditions, the circuit is substantially identical to an emitter follower circuit. With transistor 12 nonconductive the input impedance of the circuit of FIG. 1 can be expressed as a complex number having both a real and an imaginary part. In the above mentioned Hunter reference, a complex equation appears on page 15–21 which completely describes this input impedance. For the purposes of this explanation, certain assumptions can be made which considerably simplify the equation. If it is assumed that the equivalent emitter resistance ($r_e$) or transistor 10 is very small in relation to the resistance of resistor 14 and it is further assumed that the forward gain of transistor 19 ($\alpha_{fb}$) is nearly 1, the above referenced equation can be written as follows:

$$Z_i = \left[ r_b + \frac{\frac{\omega^2 R}{\omega_{\alpha fb}}\left(\frac{1}{\omega_{\alpha fb}} RC\right)}{\left(\frac{\omega}{\omega_{\alpha fb}}\right)^2 (1+\omega^2 (RC)^2)} \right] - j \frac{\frac{\omega}{\omega_{\alpha fb}}\left(1+\frac{\omega RC}{\omega_{\alpha fb}}\right)}{\left(\frac{\omega R}{\omega_{\alpha fb}}\right)^2 (1+\omega^2 (RC)^2)}$$

where $r_b$=base resistance of transistor 10
$\omega$=frequency of operation
$\omega_{\alpha fb}$=alpha cutoff frequency
$R$=value of resistance 14
$C$=value of capacitance 28

Figure 2:
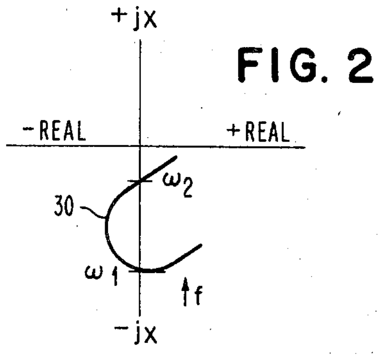
FIG. 2 is an impedance plane plot of the variation of the real and imaginary parts of the input impedance of the current switch of FIG. 1.

It can be seen from the above expression that the second term can be a negative quantity if $1/\omega_{\alpha fb} < RC$. If this negative term is larger than the sum of the equivalent base and emitter resistances ($r_b$ and $r_e$), the net input impedance of the circuit is seen to have a negative real part over certain frequency ranges. This effect can be seen in the plot of FIG. 2 wherein curve 30 indicates the variation of the circuit's input impedance with variations in frequency. As is obvious, between the angular frequencies $\omega_1$ and $\omega_2$ the aforementioned negative real part of the input impedance exists. If a circuit exhibiting such negative input impedances is connected in a circuit package whose circuit lines have significant inductance components then the circuit will oscillate at a frequency determined by the line inductance and the load capacitance.

While prior attempts at solving the above described problem have attempted to negate the negative resistance characteristics by increasing the positive resistances in the base and emitter circuits, these solutions seriously degrade the circuit operating speeds. It has been found that the circuit may be successfully stabilized without incurring the undesirable affects which resulted from the prior art solutions, by causing the value of resistor 14 to decrease over the frequency range wherein oscillations are likely to occur. The achieve this effect, a portion of resistor 14 is shunted with a frequency responsive impedance which, between the ranges $\omega_1$–$\omega_2$, exhibits a substantial short circuiting characteristic. This, in essence, decreases the value of the RC product in the above expression and prevents the occurrence of a negative resistance characteristic over the frequency range of interest.

Figure 3:
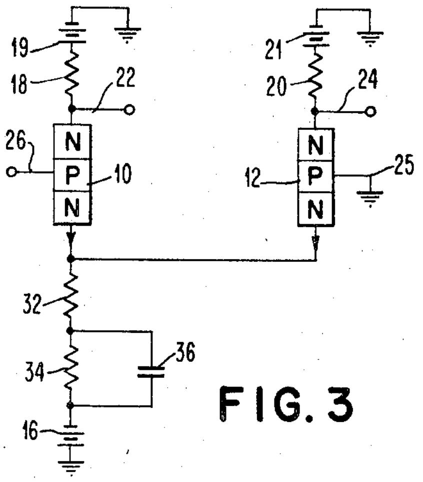
FIG. 3 is a circuit diagram of a current switch embodying a stabilization circuit which incorporates the principles of this invention.

Referring now to FIG. 3, an identical circuit to that shown in FIG. 1 is shown with the exception of the fact that common emitter resistance 14 has been divided into a pair of resistors 32 and 34, with resistor 34 being shunted by capacitor 36. Capacitor 36 is specially chosen to have an impedance which is much less than the value of resistor 34 over the frequency range wherein oscillations may occur. To provide the desired effect, the reactance of capacitor 36 should desirably be less than ⅕ of the value of resistor 34, at the lowest frequency where oscillations occur. By connecting capacitor 36 in shunt with resistor 34 the effective emitter resistance of transistor 10 is substantially reduced and the negative resistance component of the input impedance is prevented from occurring.

Figure 4:
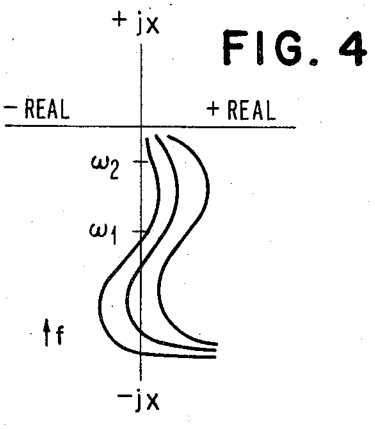
FIG. 4 is an impedance plane plot of the variations of the real and imaginary parts of the input impedance of the current switch circuit of FIG. 3.

As shown in FIG. 4, the addition of bypass capacitor 36 to the emitter circuit of transistor 10 causes the input impedance plot to shift into the positive resistance quadrant between $\omega_1$ and $\omega_2$. As can be seen, at somewhat lower frequencies (below $\omega_1$) a negative real part of the input impedance still exists, but at these frequencies, the inductive impedance of the circuit lines is insufficient to allow oscillations to occur and for this reason, this negative impedance range can be ignored.

In the course of choosing design values for a compensation circuit such as that shown in FIG. 3, it is desirable to assure that the RC time constant of resistor 32 and capacitor 36 is long with respect to data signal rise and fall times. Thus, over the period of a pulse rise or fall time, there is a negligible change in the charge of capacitor 36 with the result being a substantially undiminished circuit operating speed.

Figure 5:
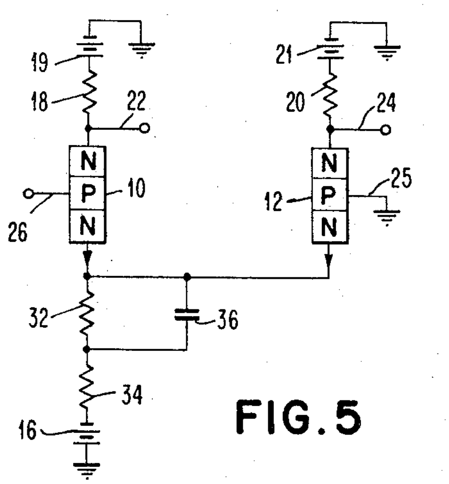
FIG. 5 is a circuit diagram of the current switch utilizing a modified form of stabilization circuit.

Referring now to FIG. 5, a modification of the stabilization circuit of FIG. 3 is illustrated. In this circuit, shunt capacitor 36 is connected around resistor 32 rather than resistor 34. In operation, the two circuits are substantially indistinguishable in that capacitor 36, at the low frequencies, appears like an open circuit allowing the entire sum of resistors 32 and 34 to appear at the common emitter connection between transistors 10 and 12. At the higher frequencies where the negative real part of the impedance appears, capacitor 36 appears as a substantial short circuit around resistor 32. The result is that the AC resistance in the common emitter circuit of transistors 10 and 12 is basically the value of resistor 34.

Figure 6:
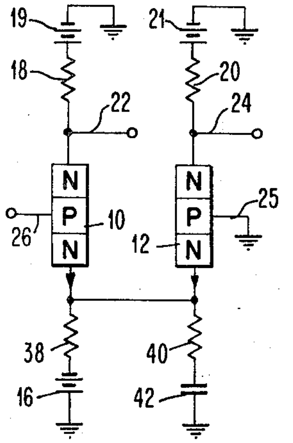
FIG. 6 is a current switch using still another form of stabilization circuit.

In FIG. 6, still another modification to the stabilization circuit is shown. Here, the common emitter resistor 38 is a single resistance and is shunted by a series circuit including resistor 40 and capacitor 42. The operation of the circuit of FIG. 6 is substantially similar to the preceding circuits except for the fact that at high frequencies where the negative real part of the impedance occurs, the effective AC resistance in the emitter circuit of transistors 10 and 12 is the parallel resistance of resistors 38 and 40. In the same manner as aforestated, capacitor 42 is a substantial short circuit to ground at these frequencies.

While it must be understood that the exact values of the emitter resistors and shunting capacitor are subject to change in accordance with the specific transistors, packaging characteristics (inductance and capacitance), power supply levels and characteristics of the input signals, the following set of values has been found to operate satisfactorily for the circuit of FIG. 3:

| | | |
|---|---|---|
| Transistors **10** and **12** | | 2N709 |
| Resistors **18** and **20** | ohms | 50 |
| Collector supply | volts | 1.2 |
| Emitter supply | do | —3 |
| Resistor | | |
| **32** | ohms | 40 |
| **34** | do | 110 |
| and | | |
| Capacitor **36** | picofarads | 100 |

While the invention has been particularly shown and described with reference to preferred embodiments thereof, it will be understood by those skilled in the art that various changes in form and details may be made therein without departing from the spirit and scope of the invention. For instance, while only NPN transistors have been shown it should be understood that any other semiconductor device can readily be substituted therefor with appropriate bias changes. In addition, while the invention has been illustrated in the context of the current switch, it is also applicable to other emitter follower circuits. Thus, grounded base transistor 12 might be deleted and a plurality of input emitter followers connected in parallel with transistor 10 to provide an emitter follower logic circuit.

We claim:

1. In a circuit including a semiconductor having emitter, base and collector electrodes, said base electrode adapted to be connected to an input signal line which, over a predetermined range of frequencies exhibits inductive characteristics, the combination comprising:

resistive means connected between a potential source and said emitter electrode;

a load circuit connected to said emitter electrode, said load circuit exhibiting capacitive characteristics which over said predetermined range of frequencies cause said circuit to exhibit a negative resistance input characteristic which allows oscillations to occur; and impedance means coupled in shunt about at least a portion of said resistive means, the reactance of said impedance means over said predetermined range of frequencies being sufficiently small to reduce the effective resistance of said resistive means to a substantial fraction of its value thereby eliminating said negative resistance characteristic.

2. In a circuit including a semiconductor having emitter, base and collector electrodes, said base electrode adapted to be connected to an input signal line which, over a predetermined range of frequencies exhibits inductive characteristics, the combination comprising:

resistive means connected between a potential source and said emitter electrode;

a load circuit connected to said emitter electrode, said load circuit exhibiting capacitive characteristics which over said predetermined range of frequencies cause said circuit to exhibit a negative resistance input characteristic which allows oscillations to occur; and capacitive means coupled in shunt about at least a portion of said resistive means, the reactance of said capacitive means over said predetermined range of frequencies being sufficiently small to reduce the effective resistance of said resistive means to a substantial fraction of its value thereby eliminating said negative resistance characteristics.

3. The invention as recited in claim 2 wherein said load circuit includes a second semiconductor whose emitter electrode is connected to said resistive means and whose base electrode is connected to a reference potential 4. In a circuit including a semiconductor having emitter, base and collector electrodes, said base electrode adapted to be connected to an input signal line which, over a predetermined range of frequencies exhibits inductive characteristics, the combination comprising:

a pair of resistive means serially connected between a potential source and said emitter electrode;

a load circuit connected to said emitter electrode, said load circuit exhibiting capacitive characteristics which over said predetermined range of frequencies cause said circuit to exhibit a negative resistance input characteristic which allows oscillations to occur; and impedance means coupled in shunt about one of said resistive means, the reactance of said impedance means over said predetermined range of frequencies being sufficiently small to effectively short circuit said one resistive means, thereby substantially lessening the emitter resistance seen by said semiconductor and eliminating said negative resistance characteristic.

5. In a circuit including a semiconductor having emitter, base and collector electrodes, said base electrode adapted to be connected to an input signal line which, over a predetermined range of frequencies exhibits inductive characteristics, the combination comprising:

a pair of resistors serially connected between a potential source and said emitter electrode;

a load circuit connected to said emitter electrode, said load circuit exhibiting capacitive characteristics which over said predetermined range of frequencies cause said circuit to exhibit a negative resistance input characteristic which allows oscillations to occur; and capacitive means coupled in shunt about one of said resistors, the reactance of said capacitive means over said predetermined range of frequencies being sufficiently small to effectively eliminate said one resistor from said circuit thereby eliminating said negatve resistance characteristic, the time constant of the second of said pair of resistors and said capacitive means being long in relation to signal rise and fall times appearing on said input signal line.

6. In a crcuit including a first semiconductor having emitter, base and collector electrodes, said base electrode adapted to be connected to an input signal line which, over a predetermined range of frequencies exhibits inductive characteristics, the combination comprising:

a pair of resistors connected between a potential source and said emitter electrode;

a load circuit connected to said emitter electrode, said load circuit exhibiting capacitive characteristics which over said predetermined range of frequencies cause said circuit to exhibit a negative resistance input characteristic which allows oscillations to occur; and a capacitor coupled in shunt about one of said resistors, the reactance of said capacitor over said predetermined range of frequencies being sufficiently small to effectively short circuit said one resistor thereby eliminating said negative resistance characteristics, the time constant of the second of said pair of resistors and said capacitor being long in relation to signal rise and fall times appearing on said input signal line.

7. The invention as recited in claim 6 wherein said load circuit includes a second semiconductor whose emitter electrode is connected to the emitter electrode of said first semiconductor and whose base electrode is connected to a reference potential.

8. In a circuit including a semiconductor having emitter, base and collector electrodes, said base electrode adapted to be connected to an input signal line which, over a predetermined range of frequencies exhibits inductive characteristics, the combination comprising:

first resistive means connected between a potential source and said emitter electrode;

a load circuit connected to said emitter electrode, said load circuit exhibiting capacitive characteristics which over said predetermined range of frequencies cause said circuit to exhibit a negative resistance input characteristic which allows oscillations to occur; and a series circuit including second resistive means and capacitance means coupled in shunt about said first resistive means, the reactance of said capacitive means over said predetermined range of frequencies being sufficiently small to reduce the effective resistance connected at the emitter of said semiconductor to the value of the parallel combination of said first and second resistive means thereby preventing the occurrence of said negative resistance characteristic over said predetermined range of frequencies.

9. In a circuit including a semiconductor having emitter, base and collector electrodes, said base electrode adapted to be connected to an input signal line which, over a predetermined range of frequencies exhibits inductive characteristics, the combination comprising:

a first resistor connected between a potential source and said emitter electrode;

a load circuit connected to said emitter electrode, said load circuit exhibiting capacitive characteristics which over said predetermined range of frequencies cause said circuit to exhibit a negative resistance input characteristic which allows oscillations to occur; and a series circuit including a second resistor and a capacitor coupled in shunt about said first resistor, the reactance of said capacitor over said predetermined range of frequencies being sufficiently small to reduce the effective AC resistance connected at the emitter of said semiconductor to the value of the parallel combination of said first and second resistors thereby preventing the occurrence of said negative resisance characteristic over said predetermined range of frequencies, the time constant of said effective AC resistance and said capacitor being long in relation to signal rise and fall times appearing on said input signal line.

10. The invention as recited in claim 9 wherein said load circuit includes a second semiconductor whose emitter electrode is connected to the emitter electrode of said first semiconductor and whose base electrode is connected to a reference potential.

11. An emitter follower logic circuit, comprising:

a plurality of semiconductors having emitter, base and collector electrodes, said emitter electrodes connected in common and each said base electrode adapted to be connected to an input signal line which, over a predetermined range of frequencies exhibits inductive characteristics, the combination comprising:

resistive means connected between a potential source and said commonly connected emitter electrodes;

a load circuit connected to said commonly connected emitter electrodes, said load circuit exhibiting capacitive characteristics which over said predetermined range of frequencies cause said circuit to exhibit a negative resistance input characteristic which allows oscillations to occur; and impedance means coupled in shunt about at least a portion of said resistive means, the reactance of said impedance means over said predetermined range of frequencies being sufficiently small to reduce the effective resistance of said resistive means to a substantial fraction of its value thereby eliminating said negative resistance characteristic.

12. The logic circuit of claim 11 wherein the said impedance means comprises a capacitor having a capacitance in the order of picofarads.

13. The logic circuit of claim 12 wherein the reactance of said capacitor is less than about one-fifth the value of said shunted resistive means at the lowest frequency where oscillations occur.

References Cited

UNITED STATES PATENTS

| | | | |
|---|---|---|---|
| 2,663,765 | 12/1953 | Beisblanc | 330—94 |
| 2,964,652 | 12/1960 | Yourke | 307—88.5 |
| 3,079,567 | 2/1963 | Poorter | 330—27 |

ARTHUR GAUSS, *Primary Examiner.*

B. P. DAVIS, *Assistant Examiner.*